United States Patent
Natanzon et al.

(10) Patent No.: US 10,031,703 B1
(45) Date of Patent: Jul. 24, 2018

(54) EXTENT-BASED TIERING FOR VIRTUAL STORAGE USING FULL LUNS

(71) Applicant: EMC Corporation, Hopkinton, MA (US)

(72) Inventors: Assaf Natanzon, Tel Aviv (IL); Yochai Gal, Herzeliya (IL); Shahar Frank, Ramat Hasharon (IL)

(73) Assignee: EMC Corporation, Hopkinton, MA (US)

( * ) Notice: Subject to any disclaimer, the term of this patent is extended or adjusted under 35 U.S.C. 154(b) by 230 days.

(21) Appl. No.: 14/144,633

(22) Filed: Dec. 31, 2013

(51) Int. Cl.
*G06F 3/06* (2006.01)

(52) U.S. Cl.
CPC .......... *G06F 3/0689* (2013.01); *G06F 3/0614* (2013.01); *G06F 3/0646* (2013.01)

(58) Field of Classification Search
CPC .... G06F 3/0647; G06F 3/0665; G06F 3/0683; G06F 3/065; G06F 3/0689
USPC ................... 711/114, 100, 117, 154
See application file for complete search history.

(56) References Cited

U.S. PATENT DOCUMENTS

| | | | |
|---|---|---|---|
| 7,203,741 B2 | 4/2007 | Marco et al. | |
| 7,719,443 B1 | 5/2010 | Natanzon | |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |
| 8,103,937 B1 | 1/2012 | Natanzon et al. | |
| 8,108,634 B1 | 1/2012 | Natanzon et al. | |
| 8,214,612 B1 | 7/2012 | Natanzon | |
| 8,250,149 B2 | 8/2012 | Marco et al. | |
| 8,271,441 B1 | 9/2012 | Natanzon et al. | |
| 8,271,447 B1 | 9/2012 | Natanzon et al. | |
| 8,332,687 B1 | 12/2012 | Natanzon et al. | |
| 8,335,761 B1 | 12/2012 | Natanzon | |
| 8,335,771 B1 | 12/2012 | Natanzon et al. | |
| 8,341,115 B1 | 12/2012 | Natanzon et al. | |
| 8,364,920 B1 * | 1/2013 | Parkison | G06F 11/1453 711/161 |
| 8,370,648 B1 | 2/2013 | Natanzon | |
| 8,380,885 B1 | 2/2013 | Natanzon | |
| 8,392,458 B2 * | 3/2013 | Fukatani | G06F 3/0608 707/791 |
| 8,392,680 B1 | 3/2013 | Natanzon et al. | |
| 8,429,362 B1 | 4/2013 | Natanzon et al. | |

(Continued)

*Primary Examiner* — Tuan Thai
*Assistant Examiner* — Edward Waddy, Jr.
(74) *Attorney, Agent, or Firm* — Daly, Crowley, Mofford & Durkee, LLP

(57) ABSTRACT

Example embodiments of the present invention relate a method, a system, and a computer program product for extent-based tiering for virtual storage using full LUNs. The method includes exposing a virtual LUN comprising a first LUN in a first tier of storage having a first latency and a second LUN in a second tier of storage having a second latency and managing the virtual LUN according to properties of the first LUN, properties of the second LUN, and a policy.

29 Claims, 19 Drawing Sheets

(READ I/O)

(56) References Cited

U.S. PATENT DOCUMENTS

| | | |
|---|---|---|
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,560,671 B1 * | 10/2013 | Yahalom ............ H04L 67/1097 709/224 |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,732,403 B1 * | 5/2014 | Nayak ................ G06F 3/0641 711/135 |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,043,530 B1 * | 5/2015 | Sundaram ............ G06F 3/068 711/100 |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,255 B1 | 4/2017 | Natanzon |
| 9,619,256 B1 | 4/2017 | Natanzon et al. |
| 9,619,264 B1 | 4/2017 | Natanzon et al. |
| 9,619,543 B1 | 4/2017 | Natanzon et al. |
| 9,632,881 B1 | 4/2017 | Natanzon |
| 9,639,295 B1 | 5/2017 | Natanzon et al. |
| 9,639,383 B1 | 5/2017 | Natanzon |
| 9,639,592 B1 | 5/2017 | Natanzon et al. |
| 9,652,333 B1 | 5/2017 | Bournival et al. |
| 9,658,929 B1 | 5/2017 | Natanzon et al. |
| 9,659,074 B1 | 5/2017 | Natanzon et al. |
| 9,665,305 B1 | 5/2017 | Natanzon et al. |
| 9,668,704 B2 | 6/2017 | Fuimaono et al. |
| 9,672,117 B1 | 6/2017 | Natanzon et al. |

(56) References Cited

U.S. PATENT DOCUMENTS

| | | |
|---|---|---|
| 9,678,680 B1 | 6/2017 | Natanzon et al. |
| 9,678,728 B1 | 6/2017 | Shemer et al. |
| 9,684,576 B1 | 6/2017 | Natanzon et al. |
| 9,690,504 B1 | 6/2017 | Natanzon et al. |
| 9,696,939 B1 | 7/2017 | Frank et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 2010/0199036 A1* | 8/2010 | Siewert .............. G06F 3/0613 711/112 |
| 2010/0281230 A1* | 11/2010 | Rabii ................ G06F 3/0605 711/165 |
| 2011/0055471 A1* | 3/2011 | Thatcher ............ G06F 3/0608 711/114 |
| 2011/0055498 A1* | 3/2011 | Kano ................ G06F 11/2069 711/156 |
| 2013/0114339 A1* | 5/2013 | Kawamura ......... G06F 3/0608 365/185.09 |
| 2013/0159359 A1* | 6/2013 | Kumar ............... G06F 3/0605 707/822 |
| 2013/0238832 A1* | 9/2013 | Dronamraju ....... G06F 3/0608 711/103 |
| 2013/0254504 A1* | 9/2013 | Saito ................. G06F 3/0617 711/162 |
| 2013/0297869 A1* | 11/2013 | Mills ................. G06F 3/0674 711/112 |
| 2013/0346724 A1* | 12/2013 | Ranade ............. G06F 12/0223 711/173 |
| 2015/0067231 A1* | 3/2015 | Sundarrajan ........ G06F 3/065 711/103 |
| 2015/0081993 A1* | 3/2015 | Christopher ...... G06F 11/1451 711/162 |

\* cited by examiner

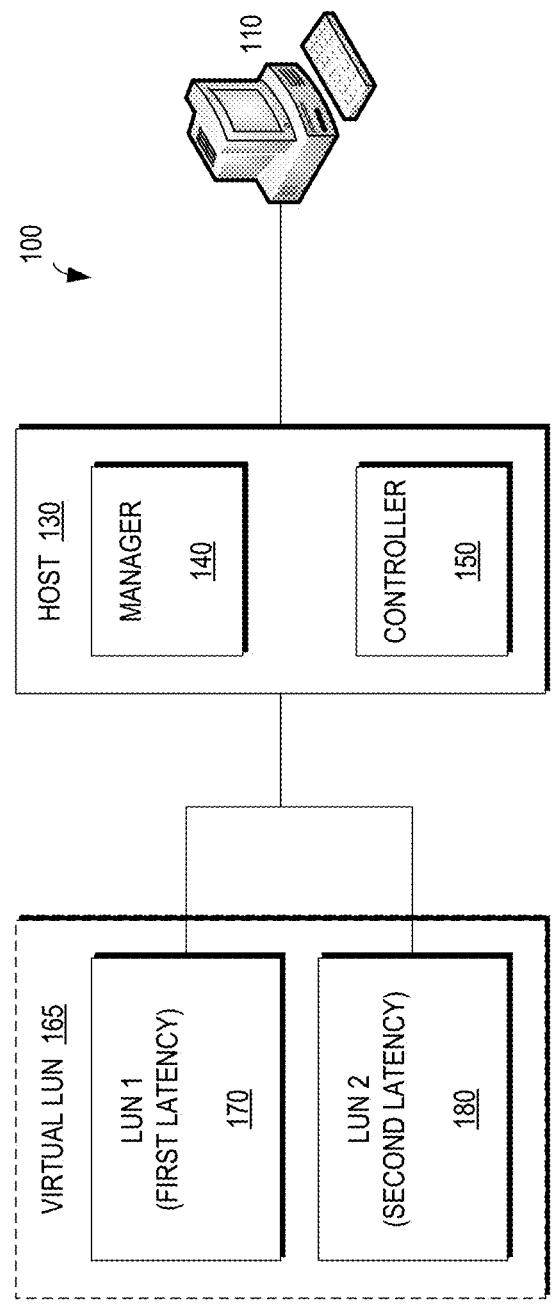

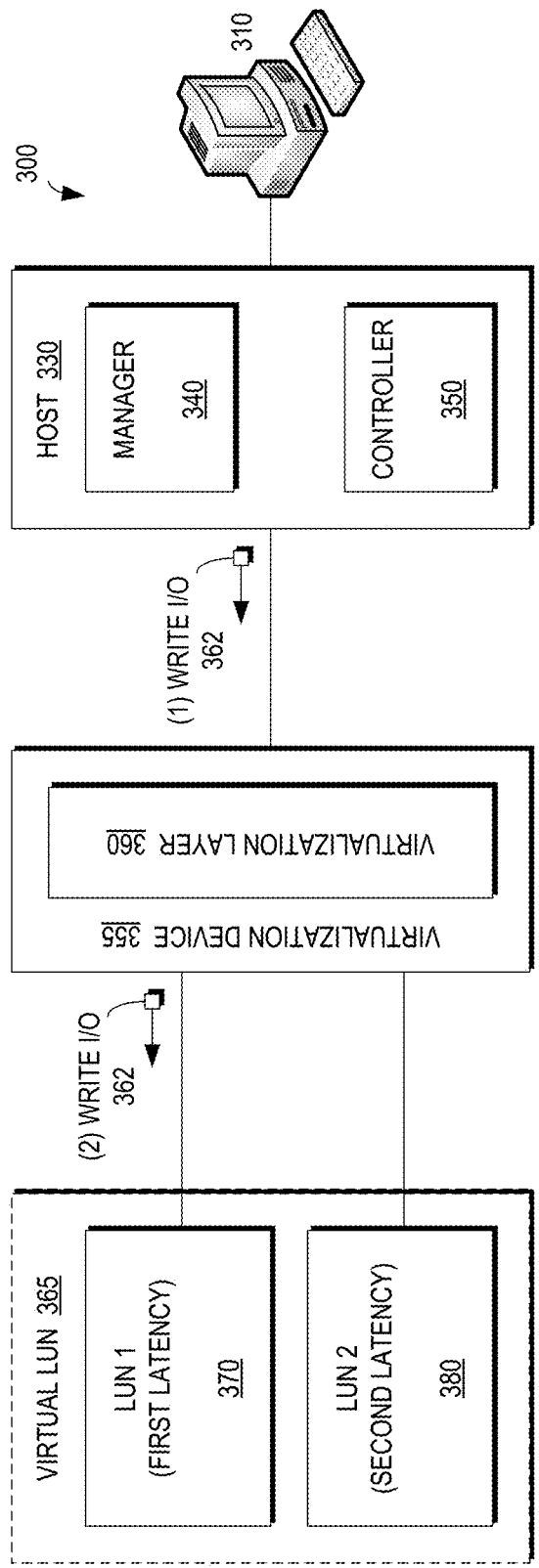
FIG. 3 (WRITE I/O)

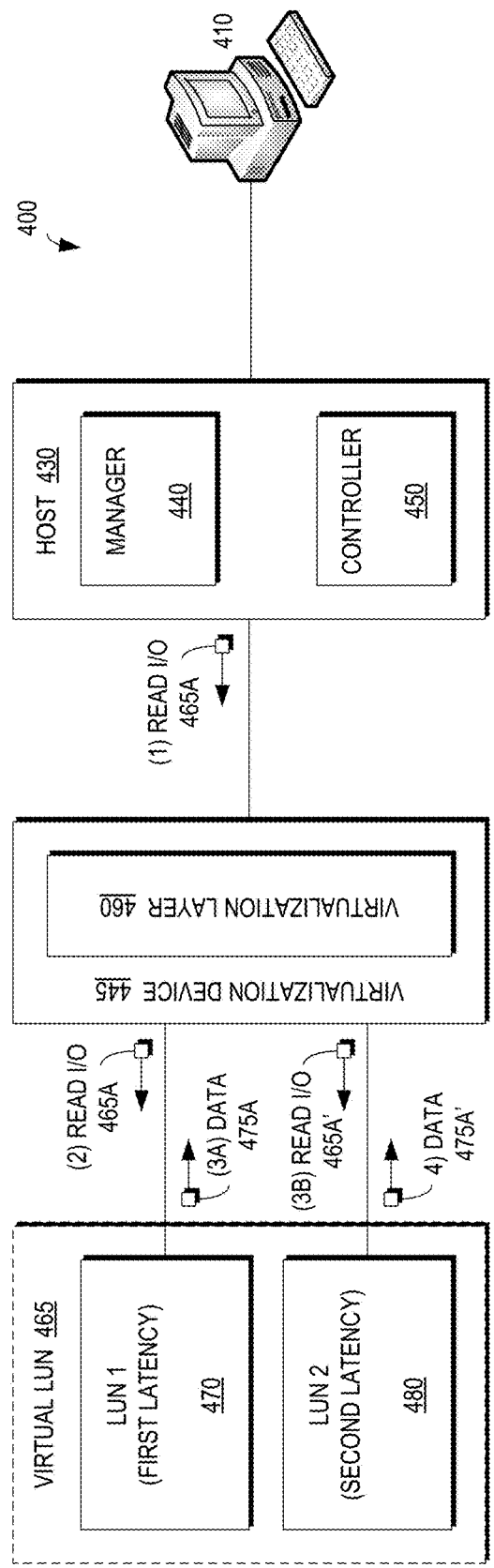
FIG. 4A (READ I/O)

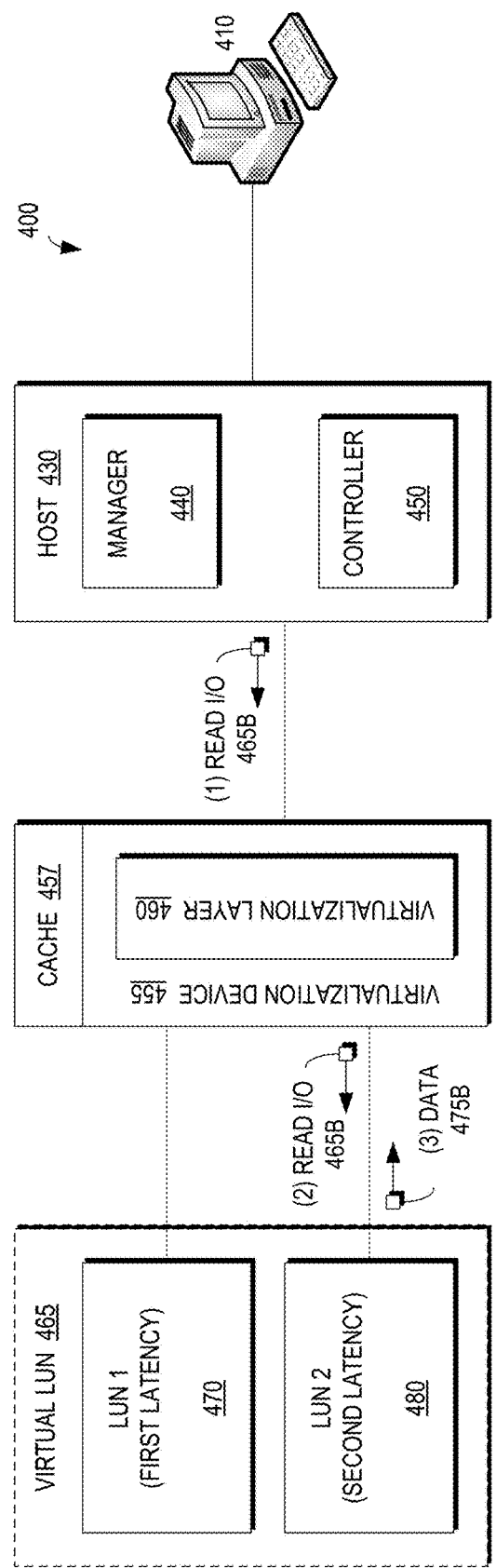
FIG. 4B (READ I/O W/ CACHE)

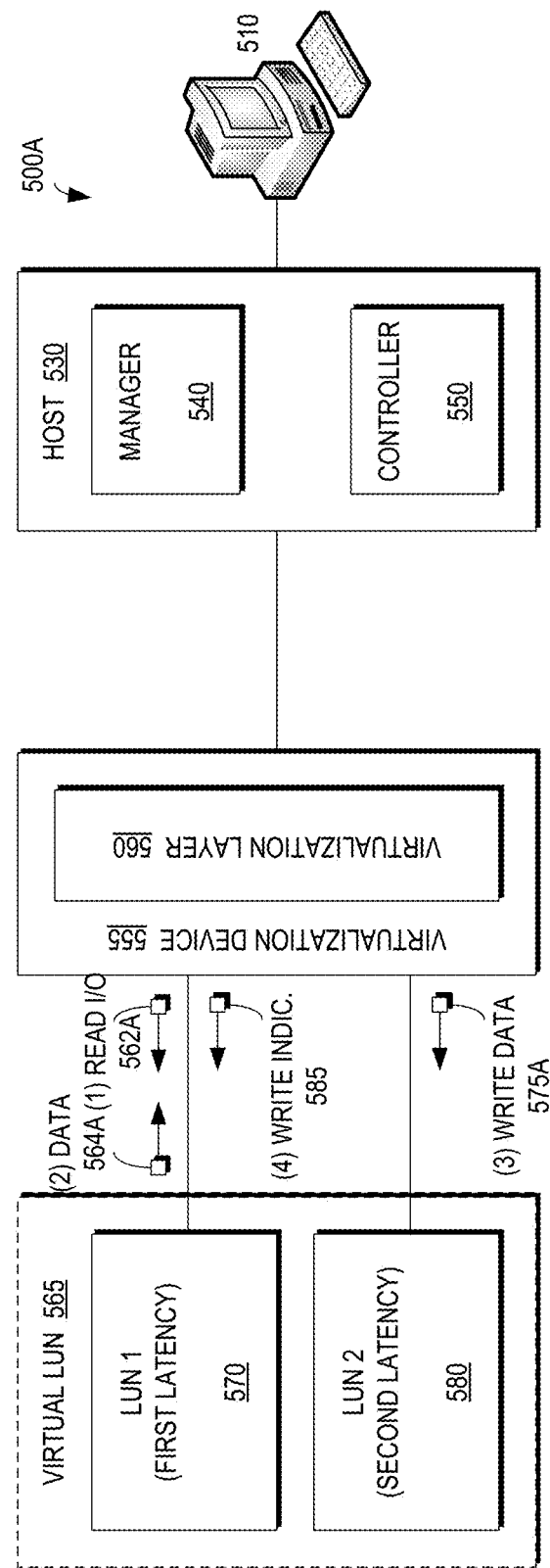
FIG. 5A (MANAGE TIER 1 TO TIER 2)

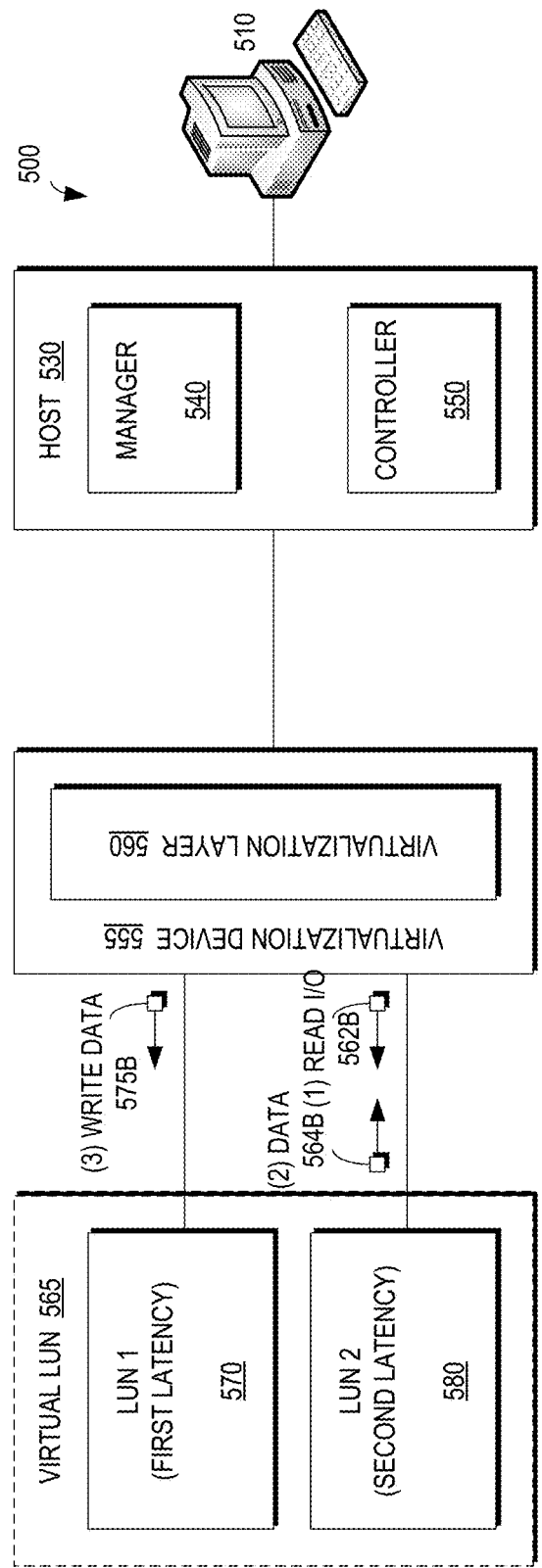
FIG. 5B (MANAGE TIER 2 TO TIER 1)

EXTENT-BASED TIERING FOR VIRTUAL STORAGE USING FULL LUNS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to virtual storage and, more specifically, to leveraging flash storage with deduplication capabilities as high tier storage.

BACKGROUND

Host processor systems may store and retrieve data using a storage device containing a plurality of host interface units (i.e. host adapters), disk drives, and other physical storage, and disk interface units (i.e., disk adapters). Such storage devices are provided, for example, by EMC Corporation of Hopkinton, Mass., and are disclosed in, for example, U.S. Pat. No. 5,206,939 to Yanai et a., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the physical storage of the storage device directly, but rather access what appears to the host systems as a plurality of logical volumes. The logical volumes may or may not correspond to the actual disk drives and/or other physical storage.

SUMMARY

Example embodiments of the present invention relate a method, a system, and a computer program product for extent-based tiering for virtual storage using full LUNs. The method includes exposing a virtual LUN comprising a first LUN in a first tier of storage having a first latency and a second LUN in a second tier of storage having a second latency and managing the virtual LUN according to properties of the first LUN, properties of the second LUN, and a policy.

BRIEF DESCRIPTION OF THE DRAWINGS

The above and further advantages of the present invention may be better under stood by referring to the following description taken into conjunction with the accompanying drawings in which:

FIG. 1 is a block diagram illustrating a system including a client, a host, and a virtual LUN comprised of a first LUN having a first latency and a second LUN having a second latency according to an example embodiment of the present invention;

FIG. 3 is a block diagram illustrating a system performing a write I/O according to an example embodiment of the present invention;

FIGS. 4A-4B and block diagrams illustrating a system managing tiering of data according to respective example embodiments of the present invention;

FIGS. 5A-5B are block diagrams illustrating a system performing a read I/O according to respective example embodiments of the present invention;

DETAILED DESCRIPTION

Figure 2A:
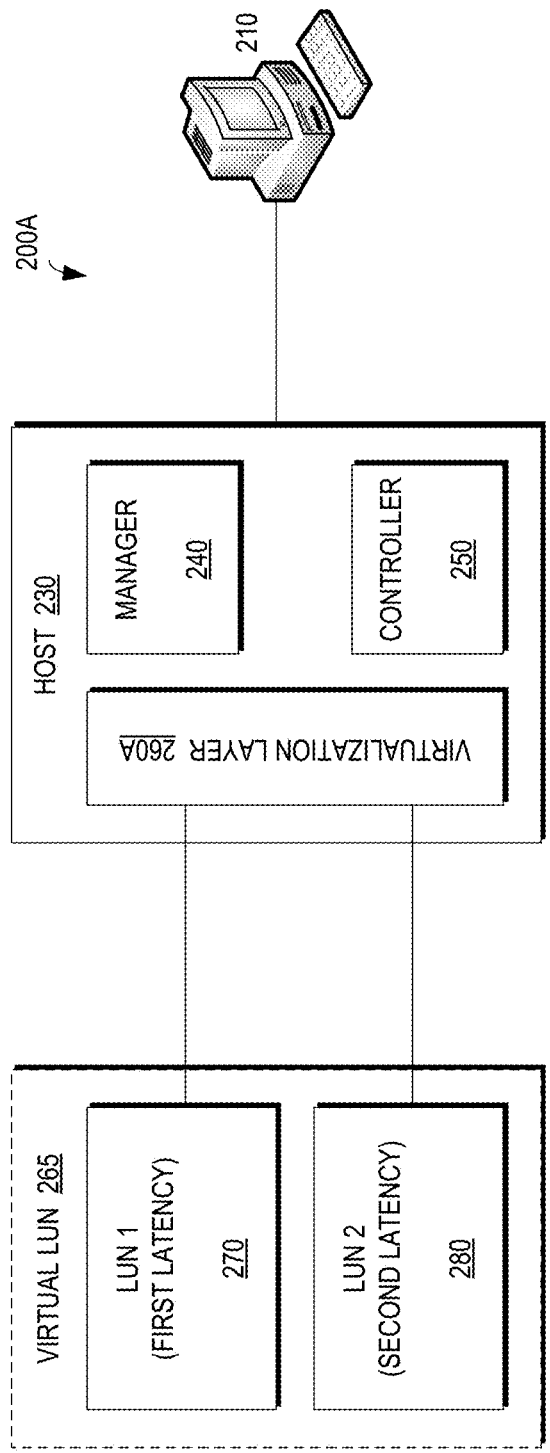
FIGS. 2A-2B are block diagrams illustrating a system including a client, a host, a virtual LUN comprised of a first LUN having a first latency and a second LUN having a second latency according to an example embodiment of the present invention, and a virtualization layer.

Historically, large storage arrays manage many disks which have been identical. However it is possible to use different types of disks and group the like kinds of disks into Tiers based on the performance characteristics of the disks. A group of fast but small disks may be a fast Tier. As well, a group of solid state drives could be another fast Tier. A group of slow but large disks may be a slow Tier. It may be possible to have other Tiers with other properties or constructed from a mix of other disks to achieve a performance or price goal. Storing often referenced, or hot, data on the fast Tier and less often referenced, or cold, data on the slow tier may create a more favorable customer cost profile than storing all data on a single kind of disk.

In addition to a storage tier, there may be a construct referred to as a storage pool. A storage pool ("pool"), as in the case of a group of storage tiers, may be made up of devices with different performance and cost characteristics. As in the case of storage tiers, it may be advantageous to locate the hot or most accessed data to the devices within the storage pool with the best performance characteristics while storing the cold, i.e. least accessed data, on the devices that have slower performance characteristics. This can lead to a lower cost system having both faster and slower devices that can emulate the performance of a more expensive system having only faster storage devices.

Early approaches have either required the customer to only use a single kind of disk or had the customer manage different tiers of disk by designing which data should be stored on which tier when the data storage definitions are created. Typically, having customers manually manage tiers or pools of storage requires the customer to do a lot of work to categorize their data and to create the storage definitions for where the different categories of storage should be put. Previous approaches required not only categorizing the data and manually placing the data on different tiers or pools, but also keeping the data classification up to date on an ongoing basis to react to changes in customer needs. Conventionally, storage of the data has also been expanded through the use of a cache. Generally, this has led to a problem of how to determine what data to store in the cache or on what storage tier.

In certain embodiments, the current techniques may track the "temperature" of data. In general, temperature corresponds to how often and how recently the data has been accessed. In general, hot data refers to data that has been accessed often and recently. In general, cold data refers to data that has not been accessed recently or often. Usually, hot data may be stored on a faster storage tier and cold data may be migrated to a slower storage tier. In certain embodiments, the current techniques may enable data migration between storage tiers based on access requests to the data on the data storage system.

Co-owned application Ser. Nos. 12/494,622, 12/640,244, 12/639,469 and 12/640,244, titled "FACILITATING DATA MIGRATION BETWEEN TIERS," "AUTOMATED DATA RELOCATION AMONG STORAGE TIERS BASED ON STORAGE LOAD," "LOGICAL UNIT MIGRATION ASSISTANT FOR HARDWARE-BASED STORAGE TIERING," and "AUTOMATED DATA RELOCATION AMONG STORAGE TIERS BASED ON STORAGE LOAD," respectively, provide a description of Fully Automated Storage Tiering (FAST) and are hereby incorporated by reference.

Typical server environments have one or more hosts access storage. Conventionally, some of the hosts may be virtual hosts or virtual machines. Generally, each virtual machine or host has a LUN or logical unit corresponding to storage space it may access. Typically, this LUN corresponds to a portion of one or more physical disks mapped to the LUN or logical drive.

Conventional Server virtualization products may have developed the capability to execute migrations of virtual machines, the underlying storage, or both to address load balancing and high availability requirements with certain limitations. Typically, conventional solutions usually require disruptive failover (i.e. failure of one site to transfer the processes to the back-up site), merged SANs, and do not work with heterogeneous products. Thus, in typical systems, if a Virtual Machine were migrated to another environment, such as a server at another location outside of a site, the virtual machine would no longer have read write access to the LUN. However, it is desirable to be able to migrate a virtual machine and have it still be able to have read write access to the underlying storage.

In certain embodiments of the instant disclosure, storage resources are enabled to be aggregated and virtualized to provide a dynamic storage infrastructure to complement the dynamic virtual server infrastructure. In an embodiment of the current invention, users are enabled to access a single copy of data at different geographical locations concurrently, enabling a transparent migration of running virtual machines between data centers. In some embodiments, this capability may enable for transparent load sharing between multiple sites while providing the flexibility of migrating workloads between sites in anticipation of planned events. In other embodiments, in case of an unplanned event that causes disruption of services at one of the data centers, the failed services may be restarted at the surviving site with minimal effort while minimizing recovery time objective (RTO).

In some embodiments of the current techniques the IT infrastructure including servers, storage, and networks may be virtualized. In certain embodiments, resources may be presented as a uniform set of elements in the virtual environment. In other embodiments of the current techniques local and distributed federation is enabled which may allow transparent cooperation of physical data elements within a single site or two geographically separated sites. In some embodiments, the federation capabilities may enable collection of the heterogeneous data storage solutions at a physical site and present the storage as a pool of resources. In some embodiments, virtual storage is enabled to span multiple data centers In some embodiments, virtual storage or a virtual storage layer may have a front end and a back end. The back end may consume storage volumes and create virtual volumes from the consumed volumes. The virtual volumes may be made up of portions or concatenations of the consumed volumes. For example, the virtual volumes may stripped across the consumed volumes or may be made up of consumed volumes running a flavor of RAID. Usually, the front-end exposes these volumes to hosts.

An example embodiment of a virtual service layer or virtual service appliance is EMC Corporation's VPLEX®. In some embodiments of the instant disclosure, a storage virtualization appliance has a back-end exposes LUNs to hosts and a front-end which talks to storage arrays, which may enable data mobility. In certain embodiments, storage may be added or removed from the virtual service layer transparently to the user FIG. 1 is a block diagram illustrating a system 100 including a client 110, a host 130, and a virtual LUN 165 comprised of a first LUN having a first latency 170 and a second LUN having a second latency 180 according to an example embodiment of the present invention. As illustrated in FIG. 1, the virtual LUN 165 may be a tiered logical unit and virtualizes the first LUN having the first latency 170 and the second LUN having the second latency 180. In certain embodiments, the first LUN having the first latency 170 may be on an XtremIO™ storage array by EMC Corporation of Hopkinton, Mass. In certain embodiments, the second LUN having the second latency may be on a traditional array, such as a Symmetrix® storage array by EMC Corporation of Hopkinton, Mass. While flash-based storage systems, such as XtremIO, may have deduplication capabilities and may have very low latency, allowing it to work well with random IOs, they have a lower capacity than traditional storage arrays.

Figure 2B:
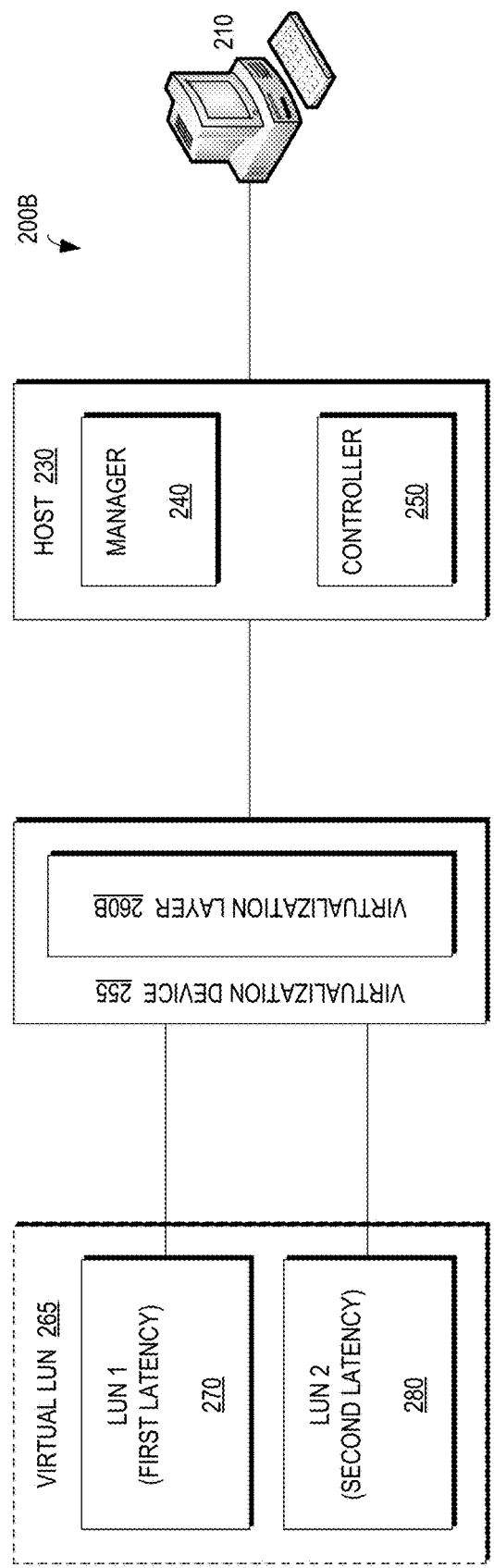
Figure 6:
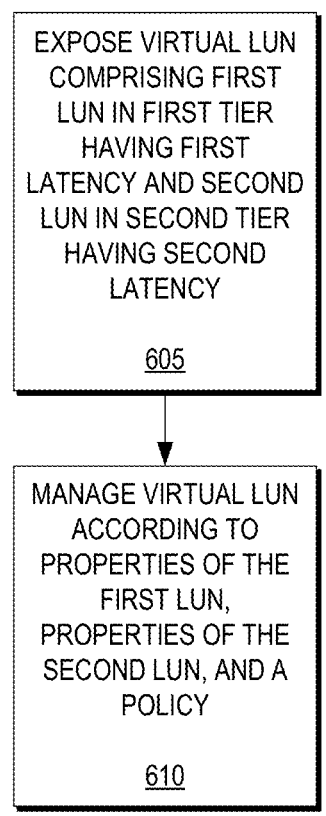
FIG. 6 is a flow diagram illustrating a method according to an example embodiment of the present invention.

FIGS. 2A-2B are block diagrams illustrating a system 200A, 200B including a client 210, a host 230, a virtual LUN 265 comprised of a first LUN having a first latency 270 and a second LUN having a second latency 280 according to an example embodiment of the present invention, and a virtualization layer 260A, 260B (260 generally). FIG. 6 is a flow diagram illustrating a method according to an example embodiment of the present invention. FIGS. 2A, 2B, and 6 may be described in conjunction. In certain embodiments, the virtualization layer 260A may be provided by the host 230; in other embodiments, the virtualization layer 260B may be provided by a virtualization device 255 such as VPLEX® by EMC Corporation of Hopkinton, Mass. The virtualization layer 260 may exposed the virtual LUN 265 as a front end comprising the first LUN in the first tier 270 and the second LUN in the second tier 280 as a back end (605). The virtualization layer 260 then may manage the virtual LUN 265 according to properties of the first LUN in the first tier 270, properties of the second LUN in the second tier 280, and a policy (610).

Accordingly, example embodiments of the present invention leverage the first LUN having the first latency 270 (e.g., XtremIO) as a high tier for tiering with VPLEX. Further, example embodiments of the present invention may leverage the de-duplication abilities of the first LUN having the first latency 270 (e.g., XtremIO) to allow significantly simpler tiering. The advantage of having tiering at a LUN level between the first LUN having the first latency 270 and the second LUN having the second latency 280 is that storage services may be leveraged. For instance, if the virtualization layer 260 supports array-aware snapshots they can be leveraged for tiered LUNs as well. Further, replication can be performed on the virtual LUN 265, such as by RecoverPoint by EMC Corporation of Hopkinton, Mass.

To create a virtual LUN 265, a first LUN having a first latency 270 may be created in a first tier of storage (e.g., XtremIO) and a second LUN having a second latency 280 may be created in a second tier of storage (e.g., Symmetrix). It should be understood that both the first LUN having the first latency 270 and the second LUN having the second latency 280 may be thin.

As will be described in greater detail below, the virtualization layer 260 need not manage any mapping between the first LUN having the first latency 270 and the second LUN having the second latency 280, such as pointers.

Figure 7:
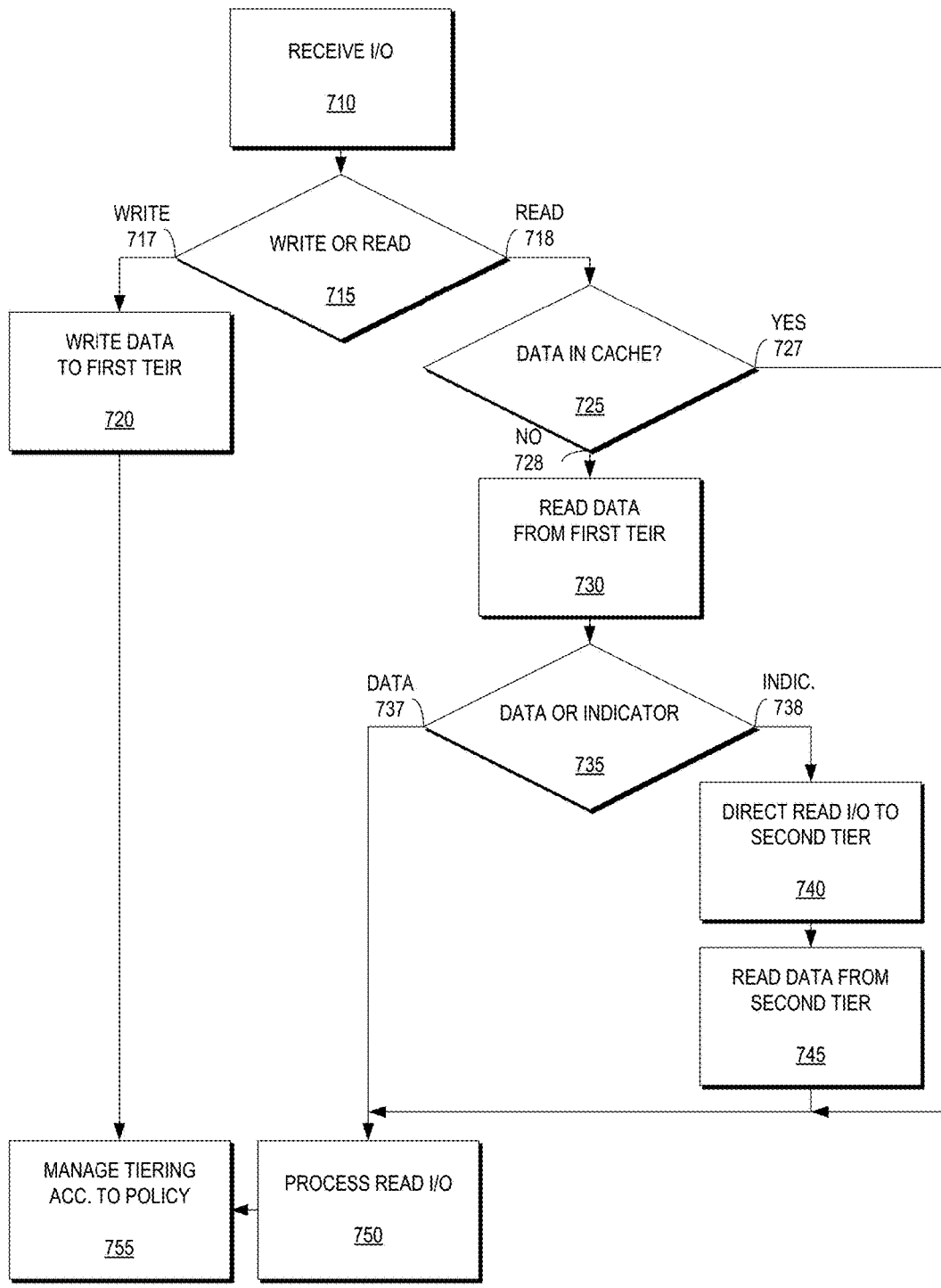
FIG. 7 is a flow diagram illustrating a method of handling read I/Os and write I/Os according to an example embodiment of the present invention.

FIG. 3 is a block diagram illustrating a system 300 performing a write I/O 362 according to an example embodiment of the present invention. FIG. 7 is a flow diagram illustrating a method of handling read I/Os and write I/Os according to an example embodiment of the present invention. FIGS. 3 and 7 may be described in conjunction.

As illustrated in FIG. 3, while the virtual LUN 365 is comprised of both the first LUN having the first latency 370 and the second LUN having the second latency 380, the virtualization layer 360 exposes only the virtual LUN 365 to the client 310. Accordingly, the virtualization layer 360 may receive an I/O (710) generated by the host 330 and determine whether it is a read I/O or a write I/O (715). For a write I/O 362 (717), the virtualization layer 360 may direct the write I/O 362 directly to the first tier 370 (720). The virtualization layer 360 then may continue to manage tiering according to the policy (755). As will be described in greater detail below, the data written in the write I/O 362 may be tiered to the second LUN having the second latency 380 by, in some embodiments, writing the data to the second LUN having the second latency 380 and then erasing the data from the first LUN having the first latency 370.

It should be understood that, to direct writes to the second tier 380, the I/O 362 may be written to the first tier 370 at a first time and then, at a second time, written to the second tier 380 and then erased from the first tier 370. In certain embodiments, a special pattern may be written to the first tier indicating that the data is not stored in the first tier 370. The special pattern may be a specific random mask which can be set per volume or per the system (e.g., a 512 byte "not exist mask"). It is important to note that since XtremIO is de-duplication aware, the write same command will be handled very efficiently and will save storage space.

Example embodiments may use the special pattern if the storage device for the first tier 370 supports deduplication so use of the same special pattern will save storage space when deduplicated; otherwise the punch command may be used to punch out data, and replace the data with zeros. Accordingly, in certain embodiments the first tier 370 may perform as a cache providing the performance of, for example, low latency flash storage with the capacity and economics of traditional storage arrays. If the write operation includes special pattern blocks of data, the write I/O may be written to both LUNs.

FIGS. 4A-4B are block diagrams illustrating a system 400 performing a read I/O 465A, 465B (465 generally) according to respective example embodiments of the present invention. FIG. 7 is a flow diagram illustrating a method of handling read I/Os and write I/Os according to an example embodiment of the present invention. FIGS. 4A, 4B, and 7 may be described in conjunction.

As illustrated in FIGS. 4A and 4B, the virtualization layer 460 may receive an I/O (710) generated by the host 330 and determine whether it is a read I/O or a write I/O (715). For a read I/O 465 (718), the virtualization layer 460 may determine the location of data satisfying the read I/O 465B via metadata retained in a cache 457 by the virtualization device 455 (725). If there is metadata describing the location of the data as in the first tier 470 or the second tier 480 (727), the virtualization device 455 may process the read I/O according to the metadata (750) (i.e., direct the read I/O 465 to the first tier 470 or the second tier 480 accordingly) and return the data to the host 430 in response to the read I/O 465B. The virtualization device 455 then may continue to manage tiering of the data according to a policy (755).

It should be understood that, as illustrated in FIG. 4A, not all virtualization devices 455 may have cache 457; accordingly, in such embodiments, or in embodiments that do have cache 457 but the cache 457 does not store metadata for the read I/O 465, the virtualization device 455 may read data 475A from the first tier 470 satisfying the read I/O 465A. The virtualization device 455 then may determine whether the data 475A read satisfying the read I/O 465A is data or an indicator indicating that the actual data satisfying the read I/O 465A is not stored in the first tier 470 (735). If it is data satisfying the read I/O 465A (737), then the virtualization device 455 may process the read I/O 465A (750) and continue to manage tiering of the data according to a policy (755). However, if it is an indicator indicating that the actual data satisfying the read I/O 465 is not stored in the first tier 470 (i.e., the random, e.g., 512 byte, pattern is read) (738), then the virtualization device 455 may direct the read I/O 465' to the second tier 480 (740) and read data 475' from the second tier (745). The virtualization device 455 may process the read I/O 465A (750) and continue to manage tiering of the data according to a policy (755). It is important to note that, for a large I/O command, some of the data may exist on the first tier and some of the data may exist on the second tier and, thus, data may be read from the second tier only for blocks where the indicator indicates that the data does not exist in the first tier.

Figure 8:
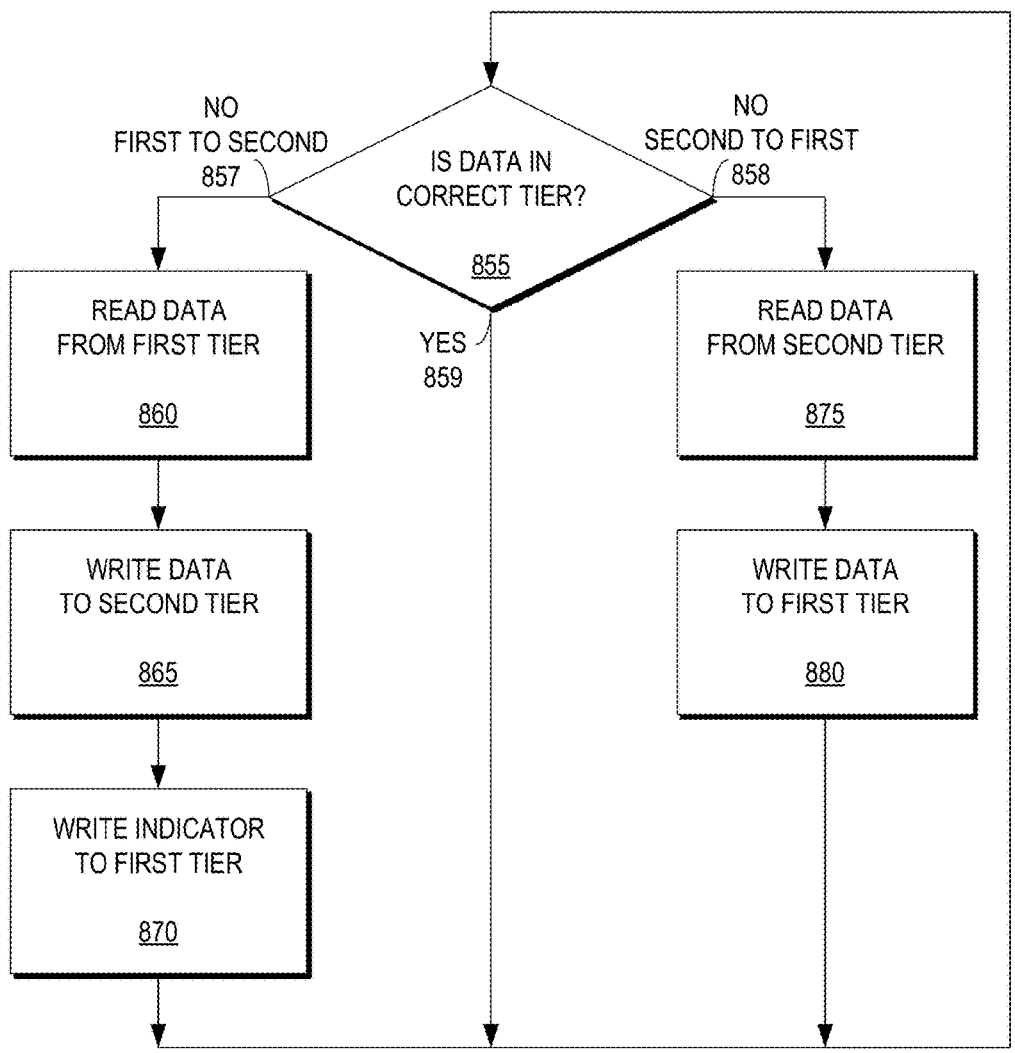
FIG. 8 is a flow diagram illustrating a method of managing tiering of data according to an example embodiment of the present invention.

FIGS. 5A-5B and block diagrams illustrating a system 500A, 500B (500 generally) managing tiering of data according to respective example embodiments of the present invention. FIG. 8 is a flow diagram illustrating a method of managing tiering of data according to an example embodiment of the present invention. FIGS. 5A, 5B, and 8 may be described in conjunction.

Complexity in managing traditional tiered storage between two separate devices is mapping. For example, some traditional tiered storage, such as FAST™ by EMC Corporation of Hopkinton, Mass., kept mapping metadata with the data on flash and SATA storage devices and required consistency across multiple storage nodes.

However, in example embodiments of the present invention, tiering is achieved without keeping a mapping between the first tier 570 and the second tier 580. The virtualization device 555 may determine whether data is stored in the correct tier (855). For example, as illustrated in FIG. 5A, tiering of data may be managed from a first tier 570 to a second tier 580 by moving data from the first LUN having the first latency 570 (e.g., XtremIO) to the second LUN having the second latency 580 (e.g., SATA). Therefore, if the virtualization device 555 determines that the data is not in the correct tier and needs to be managed from the first tier 570 to the second tier 580 (857), the virtualization device 555 may send a read I/O 562A to the first tier 570 for data to move to the second tier 580 (860). The first LUN having the first latency 570 may return data 564A satisfying the read I/O 562A which the virtualization device 555 may then write 575A to the second tier 580 (865). The virtualization device 555 then may write and indicator 585 to the first tier 570 indicating that the data is not stored on the first LUN having the first latency 570 (870). The write may be done in an efficient way using a write same SCSI command and thus sending only, for example, 512 bytes of data to the storage array.

Similarly, as illustrated in FIG. 5B, tiering of data may be managed from a second tier 580 to a first tier 570 by moving data from the second LUN having the second latency 580 (e.g., SATA) to the first LUN having the first latency 570 (e.g., XtremIO). Therefore, if the virtualization device 555 determines that the data is not in the correct tier and needs to be managed from the second tier 580 to the first tier 570 (858), the virtualization device 555 may send a read I/O 562B to the second tier 580 for data to move to the first tier 570 (875). The second LUN having the second latency 580 may return data 564(B) satisfying the read I/O 562B which the virtualization device 555 may then write 575B to the first tier 570 (880). It should be noted that there is no need to write an indicator to the second LUN having the second latency, as in FIG. 5A, because read I/Os are first directed to the first tier 570 as illustrated in FIG. 4A; However, in some implementation, example embodiments of the present invention may send a punch command to the moved area to save the space in the lower tier in case the lower tier is also a thin device.

Figure 9:
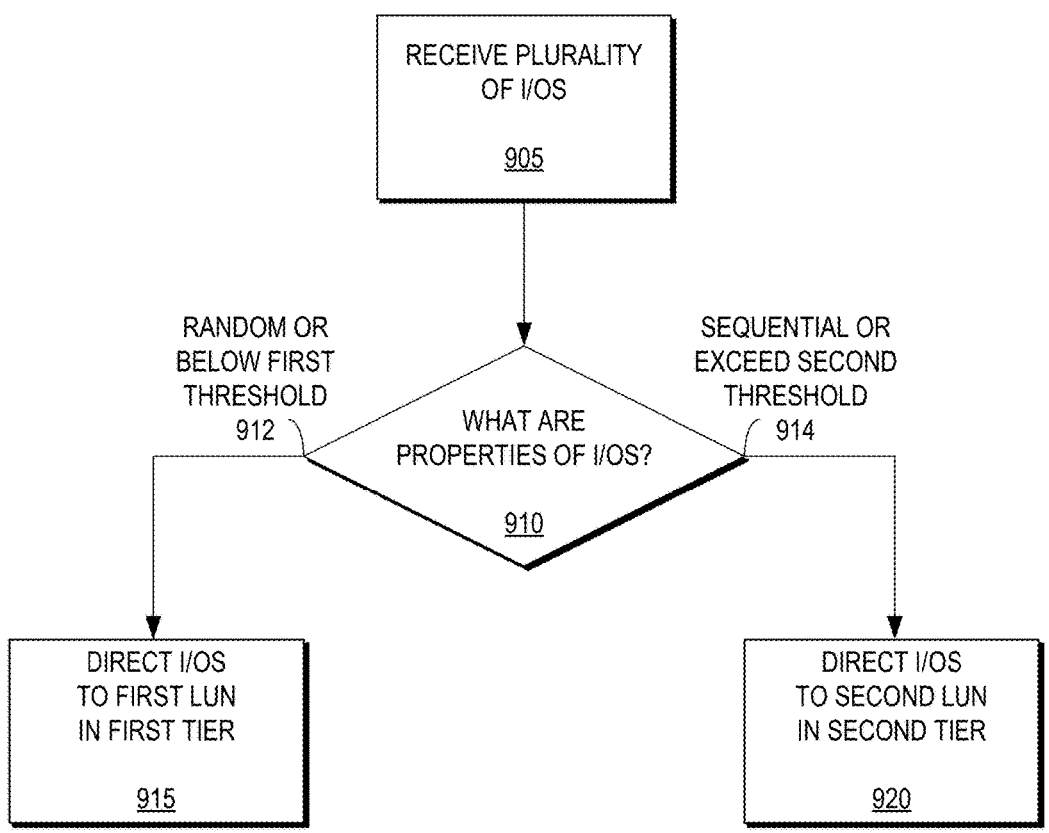
FIG. 9 is a flow diagram illustrating a method of handling write I/Os according to properties of the write I/Os according to an example embodiment of the present invention.

In certain embodiments, the virtualization device 555 may determine whether data is in the correct tier (855) according to storage tiering statistics maintained by the second tier 580 and moving active extents to the first tier 570. Data may be stored in the second tier 580 to reduce cost, with active data stored in the higher tier. In other embodiments, another tiering option is based on I/O pattern, as illustrated in FIG. 9. For example, XtremIO performs well for random I/Os; however, like all flash storage, performance for sequential I/O is reduced. Accordingly, for a plurality of I/Os, the virtualization device 555 may receive a plurality of I/Os (905) and study the properties of the I/Os (910). If the I/Os are random or the I/O size is below a first threshold (e.g., below a minimum) (912), the virtualization device 555 may direct the I/Os to the first tier (915). If the I/Os are sequential or the I/O size exceed a second threshold (e.g., above a maximum) (914), the virtualization device 555 may direct the I/Os to the second tier (920). In other embodiments, to determine which data should be moved from the first tier 570 to the second tier 580, a snapshot may be created in the first tier at a first time and, at a second time, a difference mechanism may determine which locations in the first tier 570 did not change in the snapshot over a certain period of time, move the data stored in those locations to the second tier 580, and then erase the snapshot.

Figure 10A:
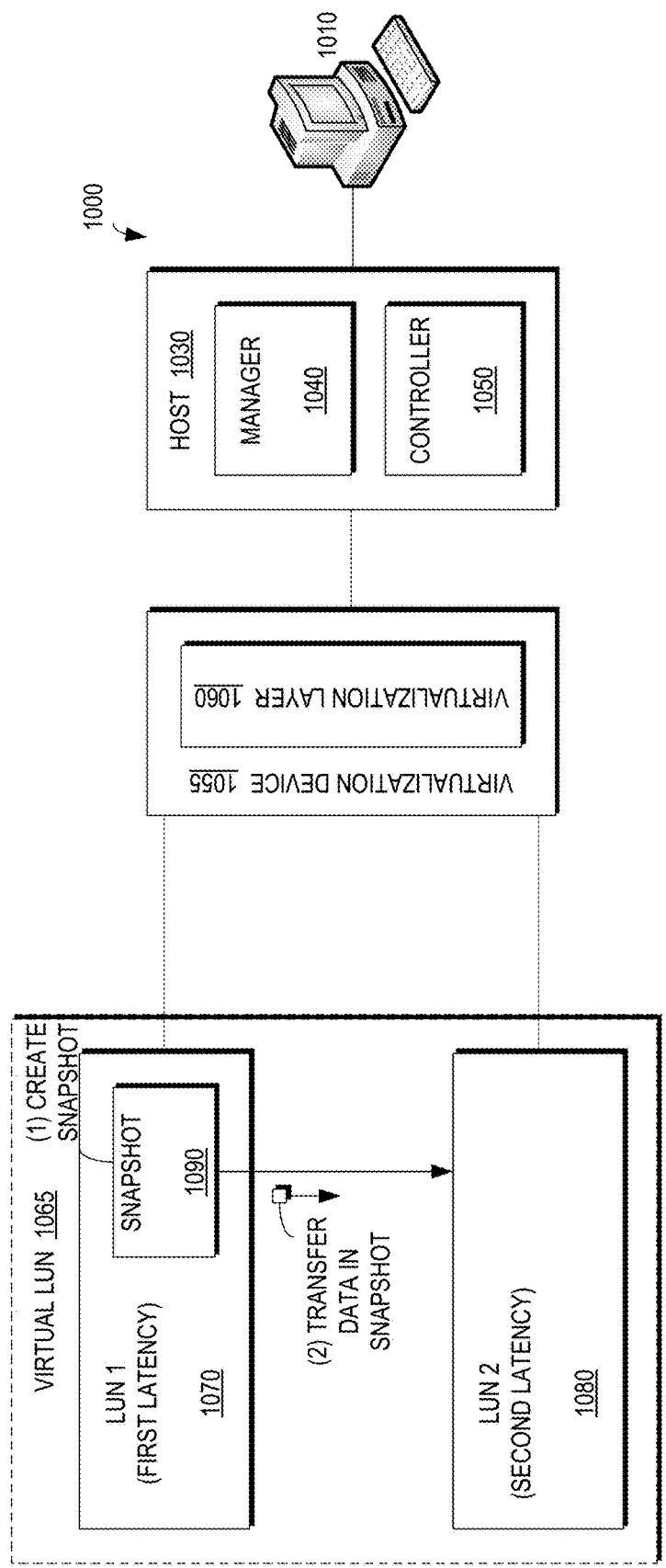
FIGS. 10A-10B are block diagrams illustrating a system creating a snapshot in a second tier of storage according to an example embodiment of the present invention.
Figure 10B:
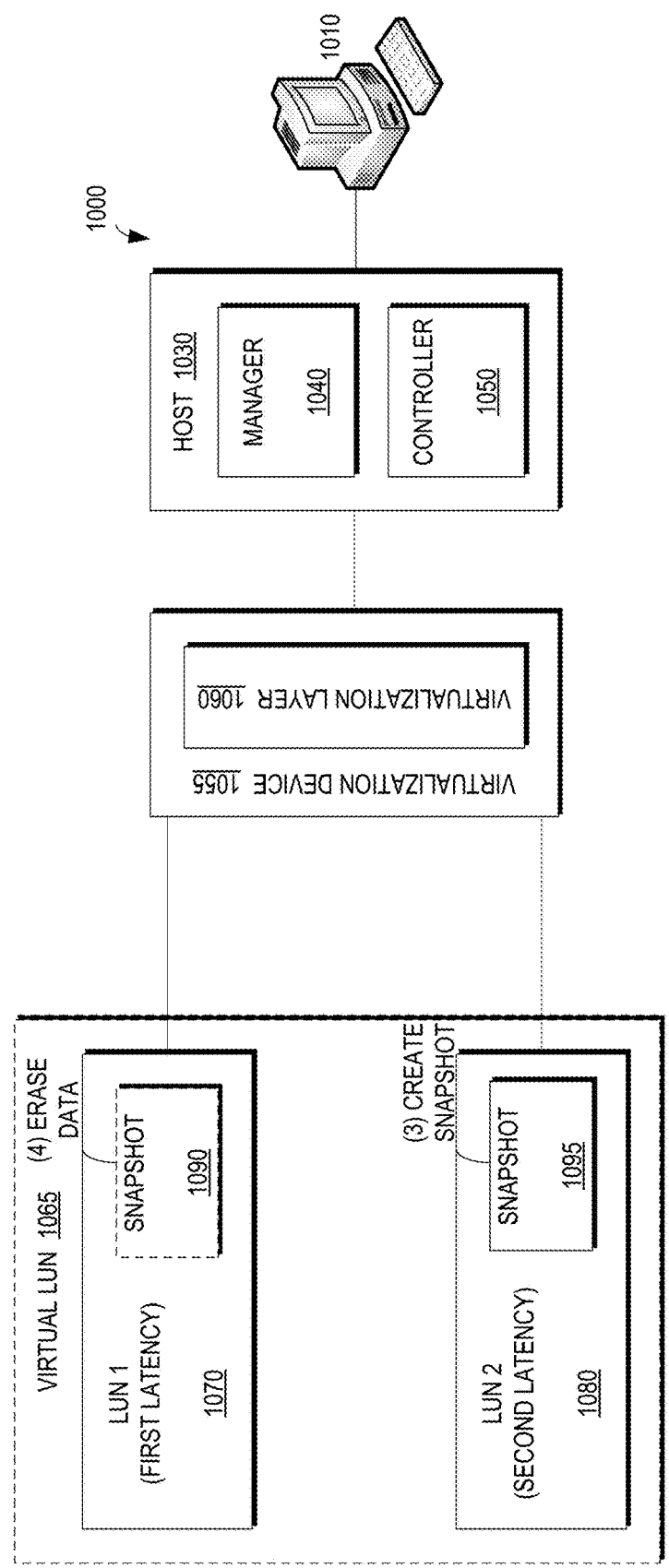
Figure 11:
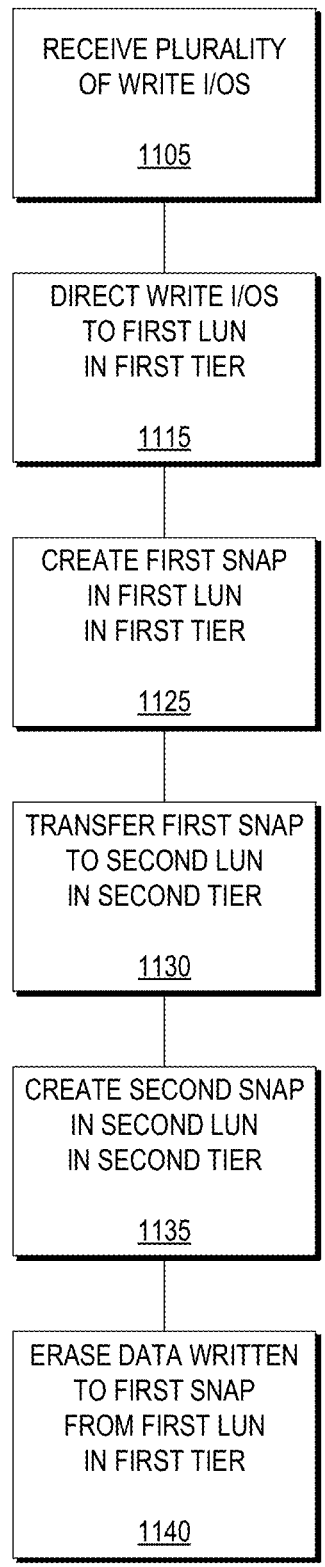
FIG. 11 is a flow diagram illustrating a method of creating a snapshot in a second tier of storage according to an example embodiment of the present invention.

FIGS. 10A-10B are block diagrams illustrating a system 100 creating a snapshot 1095 in a second tier of storage 1080 according to an example embodiment of the present invention. FIG. 11 is a flow diagram illustrating a method of creating a snapshot in a second tier of storage according to an example embodiment of the present invention. FIGS. 10A, 10B, and 11 may be described in conjunction. It should be understood that the first LUN in the first tier 1070 (e.g., XtremIO) may have more performant snapshot capabilities than traditional storage arrays (e.g., SATA) for the second tier 1080.

As illustrated in FIG. 10A, the virtualization device 1055 may receive a plurality of write I/Os from the host 1030 (1105) and direct the write I/Os to the first tier 1070 (1115). The virtualization device then may create a snapshot 1090 of the first tier 1070 (1125) and then, at a first time, transfer the data stored in the snapshot 1090 to the second tier 1080 (1130). As illustrated in FIG. 10B, at a second time, the second tier 1080 may create a snapshot 1095 at the second tier 1080 (1135). Once the data is transferred from the first tier 1070 to the second tier 1080, the snapshot 1090 may be freed/erased from the first tier 1070 (1140). It should be understood that the snapshot 1090 of the first tier 1070 may be taken periodically and the data may be shipped from the first tier 1070 to the second tier 1080 asynchronous from the creation of the snapshot 1095 on the second tier 1090. In certain embodiments, changes may be shipped from the first tier 1070 to the second tier 1080 periodically (e.g., 1-3 hours), which may cause I/Os to become more sequential as the writes build up. Once the data is punch out of the first tier 1070, the first tier 1070 may only store newer data; older data may be stored at the second tier 1080. In certain embodiments, the erasure may be done by writing the indicator instead of the data.

Figure 12:
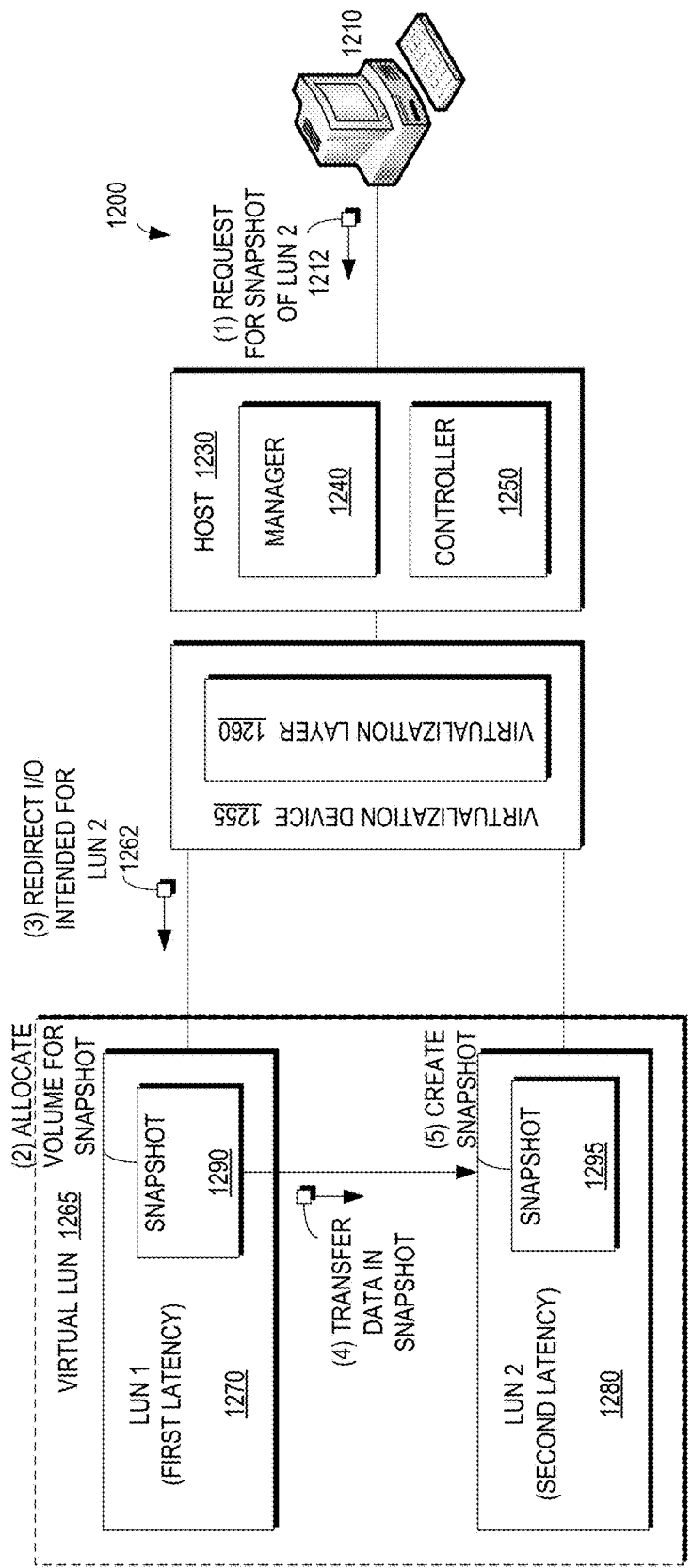
FIG. 12. is a block diagram of a system creating a snapshot in a second tier of storage according to an example embodiment of the present invention.
Figure 13:
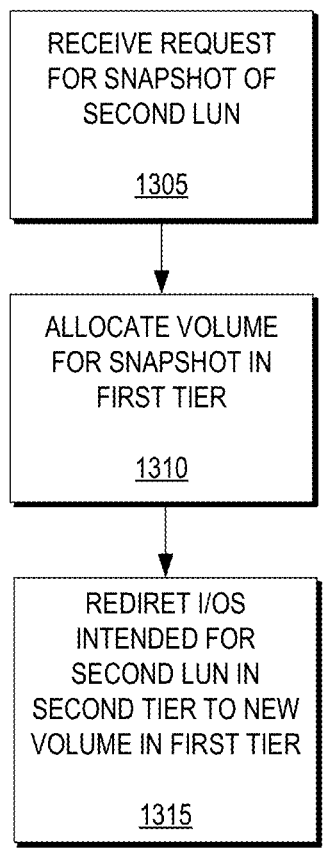
FIG. 13 is a flow diagram illustrating a method of creating a snapshot in a second tier of storage according to an example embodiment of the present invention.

FIG. 12. is a block diagram of a system 1200 creating a snapshot 1295 in a second tier 1280 of storage according to an example embodiment of the present invention. FIG. 13 is a flow diagram illustrating a method of creating a snapshot in a second tier of storage according to an example embodiment of the present invention. FIGS. 12 and 13 may be described in conjunction.

As illustrated in FIG. 12, a client 1210 may second a request 1212 to a host 1230 for a snapshot of a second LUN having a second latency 1280 (1305). For example, the request 1212 may come via client 1210 interaction with a user, such as a system administrator. The virtualization device 1255 may allocation a volume for the snapshot 1290 in the first LUN having the first latency 1270 (1310) and redirect I/Os 1262 intended for the second LUN having the second latency 1280 to the first LUN having the first latency 1270 (1315). As described above with respect to FIGS. 10B and 11, the virtualization device 1255 then may transfer the data stored in the snapshot 1290 to the second tier 1280 (1130) and, at a second time, create a snapshot 1295 at the second tier 1280 (1135). Once the data is transferred from the first tier 1270 to the second tier 1280, the snapshot 1290 may be freed/erased from the first tier 1270 (1140).

Figure 14:
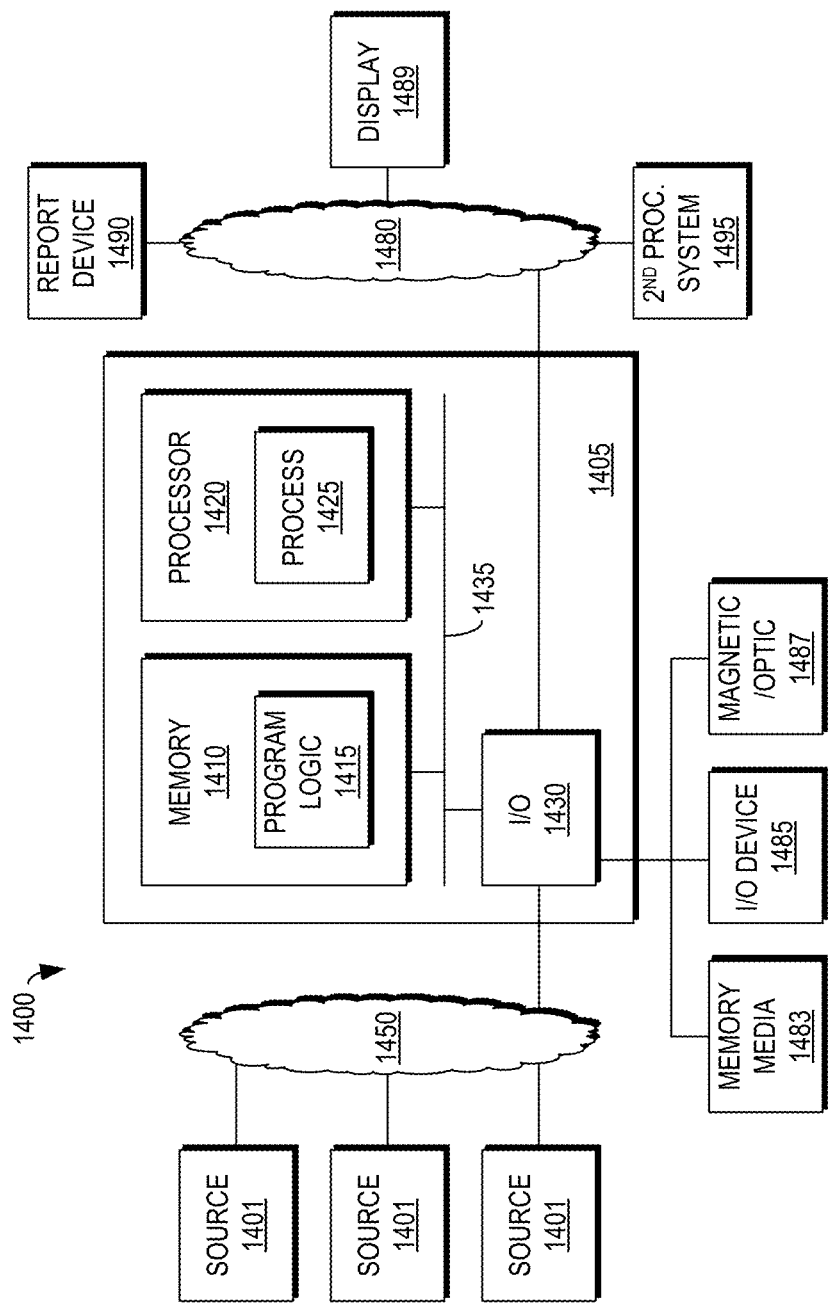
FIG. 14 is a block diagram of an example embodiment apparatus according to the present invention.

FIG. 14 is a block diagram of an example embodiment apparatus 1405 according to the present invention. The apparatus 1405 may be part of a system 1400 and includes memory 1410 storing program logic 1415, a processor 1420 for executing a process 1425, and a communications I/O interface 1430, connected via a bus 1435.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 14, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 15:
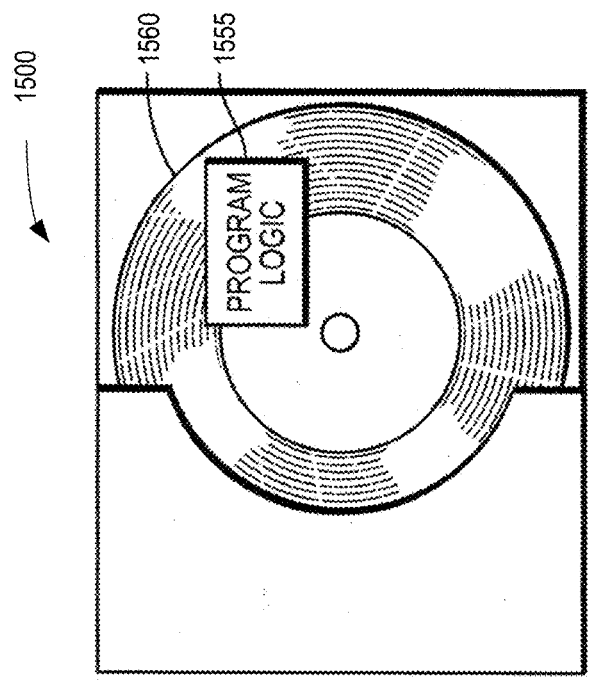
FIG. 15 is an illustration of an example embodiment of the present invention as embodied in program code.

FIG. 15 shows program logic 1555 embodied on a computer-readable medium 1560 as shown, and wherein the logic 1555 is encoded in computer-executable code configured for carrying out the methods of this invention, thereby forming a computer program product 1500.

The logic for carrying out the method may be embodied as part of the aforementioned system, which is useful for carrying out a method described with reference to embodiments shown. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method comprising:
exposing to a storage host, via a virtual service layer spanning a first storage array including storage having a first latency and a second storage array including storage having a second latency, a virtual logical unit (LUN) comprising a first LUN in a first tier of storage provided by the first storage array having the first latency and a second LUN in a second tier of storage provided by the second storage array having the second latency, wherein the first latency is lower than the second latency; and managing the virtual LUN according to properties of the first LUN, properties of the second LUN, and an indicator written to the first LUN in the first tier of storage provided by the first storage array indicating that data satisfying a policy is stored in the second LUN in the second tier of storage provided by the second storage array, wherein managing the virtual LUN comprises:
directing a plurality of write I/O for processing to the first LUN in the first tier at a first time;
moving data written to the first LUN in the first tier to the second LUN in the second tier at a second time, wherein moving data written to the first LUN in the first tier to the second LUN in the second tier at a second time comprises:
creating a first snapshot of data in the first LUN in the first tier;
transferring data in the first snapshot to the second LUN in the second tier;
creating a second snapshot of data in the second LUN in the second tier; and
erasing the data written to the first snapshot from the first LUN in the first tier; and,
processing an I/O command for data, wherein a first portion of the data exists in the first tier and a second portion of the data exists in the second tier, wherein data is read from the second tier only for blocks in which the indicator indicates that the data does not exist in the first tier.

2. The method of claim 1 wherein managing the virtual LUN comprises:
directing a read I/O for processing to the first LUN in the first tier;
determining whether data returned by the first LUN in the first tier is data satisfying the read I/O;
if the data returned by the first LUN is data satisfying the read I/O, then providing the data in response to the receive read I/O; and
if the data returned by the first LUN is the indicator indicating that the data satisfying the read I/O is stored on the second LUN in the second tier, then redirecting the read I/O to the second LUN in the second tier according to the indicator.

3. The method of claim 1 wherein managing the virtual LUN comprises:
examining a cache to determine whether data satisfying the read I/O is stored in the cache or on the second LUN in the second tier;
if the data satisfying the read I/O is stored in the cache then returning the data in response to the read I/O; and
if the data satisfying the read I/O is not stored in the cache then directing the read I/O for processing to the second LUN in the second tier.

4. The method of claim 1 wherein managing the virtual LUN comprises managing tiering of data stored on the virtual LUN according to the policy, comprising:
reading data satisfying the policy from the second LUN in the second tier; and
writing the data satisfying the policy to the first LUN in the first tier.

5. The method of claim 1 wherein managing the virtual LUN comprises managing tiering of data stored on the virtual LUN according to the policy, comprising:
reading data satisfying the policy from the first LUN in the first tier;
writing the data satisfying the policy to the second LUN in the second tier; and
writing the indicator to the first LUN in the first tier indicating that the data satisfying the policy is stored in the second LUN in the second tier.

6. The method of claim 5 wherein writing the indicator to the first LUN in the first tier indicating that the data satisfying the policy is stored in the second LUN in the second tier comprises writing an empty pattern to the first LUN in place of the data satisfying the policy.

7. The method of claim 6
wherein writing an empty pattern to the first LUN in place of the data satisfying the policy comprises writing a deduplication-size block to the first LUN indicative of the data satisfying the policy being written to the second LUN;
the method further comprising deduplicating a plurality of empty patterns written to the first LUN to enable reduction of storage required on the first LUN.

8. The method of claim 1 wherein exposing a virtual LUN comprises:
exposing the second LUN in the second tier to a user;
receiving a request from the user for increased LUN performance; and
initializing the first LUN in the first tier for exposure with the second LUN in the second tier as the virtual LUN.

9. The method of claim 1 wherein exposing a virtual LUN comprises:
exposing the first LUN in the first tier to a user;
receiving a request from the user for increased storage capacity; and
initializing the second LUN in the second tier for exposure with the first LUN in the first tier as the virtual LUN.

10. The method of claim 1 wherein managing the virtual LUN comprises:
receiving a plurality of write I/Os;
analyzing the plurality of write I/Os to determine properties of the plurality of write I/Os;
if the write I/Os are sequential or exceed a first size threshold, directing the write I/Os to the second LUN in the second tier; and
if the write I/Os are random or are below a second size threshold, directing the write I/Os to the first LUN in the first tier.

11. The method of claim 1 further comprising:
continuing to direct new write I/Os for processing to the first LUN in the first tier after the first snapshot is created;
wherein erasing the data written to the first snapshot from the first LUN in the first tier comprises erasing data written to the first snapshot from the first LUN in the first tier except for data that was overwritten by new write I/Os directed for processing to the first LUN in the first tier.

12. The method of claim 1 wherein creating a first snapshot of data in the first LUN in the first tier comprises:
receiving a request from a user for a requested snapshot of the second LUN in the second tier;
allocating a new volume for the first snapshot of data in the first LUN in the first tier; and
redirecting I/Os intended for the second LUN in the second tier to the new volume for the first snapshot in the first tier.

13. The method according to claim 1, further including determining that data for an I/O operation is not in a correct one of the first and second tiers and needs to be managed from the first tier to the second tier, and sending a read I/O to the first tier for the data to move to the second tier, wherein the first tier returns the data, which is written to the second tier.

14. The method according to claim 1, further including determining whether data satisfying a read I/O is located in the first tier or the second tier via metadata in a cache associated with the virtual service layer.

15. The method according to claim 1, wherein the virtualization layer does not manage mapping between the first LUN and the second LUN.

16. A system comprising:
a first storage array including storage having a first latency and a first logical unit (LUN) therein;
a second storage array including storage having a second latency and a second LUN therein, wherein the first latency is lower than the second latency;
a virtual service layer spanning the first storage array and the second storage array configured to expose to a storage host a virtual LUN comprising the first LUN in the first tier of storage provided by the first storage array having the first latency and the second LUN in the second tier of storage provided by the second storage array having the second latency; and
a manager configured to manage the virtual LUN according to properties of the first LUN, properties of the second LUN, and an indicator written to the first LUN in the first tier of storage provided by the first storage array indicating that data satisfying a policy is stored in the second LUN in the second tier of storage provided by the second storage array, wherein managing the virtual LUN comprises:
directing a plurality of write I/O for processing to the first LUN in the first tier at a first time;
moving data written to the first LUN in the first tier to the second LUN in the second tier at a second time, wherein moving data written to the first LUN in the first tier to the second LUN in the second tier at a second time comprises:
creating a first snapshot of data in the first LUN in the first tier;
transferring data in the first snapshot to the second LUN in the second tier;
creating a second snapshot of data in the second LUN in the second tier; and
erasing the data written to the first snapshot from the first LUN in the first tier; and,
processing an I/O command for data, wherein a first portion of the data exists in the first tier and a second portion of the data exists in the second tier, wherein data is read from the second tier only for blocks in which the indicator indicates that the data does not exist in the first tier.

17. The system of claim 16 further comprising:
a controller configured to direct read I/Os for processing to the first LUN in the first tier and determine whether data returned by the first LUN in the first tier is data satisfying the read I/O;
wherein the manager is further configured to, if the data returned by the first LUN is data satisfying the read I/O, provide the data in response to the receive read I/O, and, if the data returned by the first LUN is the indicator indicating that the data satisfying the read I/O is stored on the second LUN in the second tier, redirect the read I/O to the second LUN in the second tier according to the indicator.

18. The system of claim 16 further comprising:
a controller configured to examine a cache to determine whether data satisfying the read I/O is stored in the cache or on the second LUN in the second tier; and
wherein the manager is further configured to, if the data satisfying the read I/O is stored in the cache, return the data in response to the read I/O, and, if the data satisfying the read I/O is not stored in the cache, direct the read I/O for processing to the second LUN in the second tier.

19. The system of claim 16 wherein the manager is further configured to manage tiering of data stored on the virtual LUN according to the policy from the second LUN in the second tier to the first LUN in the first tier by reading data satisfying the policy from the second LUN in the second tier and writing the data satisfying the policy to the first LUN in the first tier.

20. The system of claim 16 wherein the manager is further configured to manage tiering of data stored on the virtual LUN according to the policy from the first LUN in the first tier to the second LUN in the second tier by reading data satisfying the policy from the first LUN in the first tier, writing the data satisfying the policy to the second LUN in the second tier, and writing the indicator to the first LUN in the first tier indicating that the data satisfying the policy is stored in the second LUN in the second tier.

21. The system of claim 20 wherein the manager is further configured to write an empty pattern to the first LUN in place of the data satisfying the policy.

22. The system of claim 21
wherein the manager is further configured to write a deduplication-size block to the first LUN indicative of the data satisfying the policy being written to the second LUN.

23. The system of claim 16
wherein the virtualization layer is further configured to expose the second LUN in the second tier to a user; and
wherein the manager is further configured to receive a request from the user for increased LUN performance and initialize the first LUN in the first tier for exposure with the second LUN in the second tier as the virtual LUN.

24. The system of claim 16
wherein the virtualization layer is further configured to expose the first LUN in the first tier to a user; and
wherein the manager is further configured to receive a request from the user for increased storage capacity and initialize the second LUN in the second tier for exposure with the first LUN in the first tier as the virtual LUN.

25. The system of claim 16 further comprising a controller configured to receive a plurality of write I/Os, analyze the plurality of write I/Os to determine properties of the plurality of write I/Os, if the write I/Os are sequential or exceed a first size threshold, direct the write I/Os to the second LUN in the second tier, and, if the write I/Os are random or are below a second size threshold, direct the write I/Os to the first LUN in the first tier.

26. The system of claim 16
wherein the controller is further configured to continue to direct new write I/Os for processing to the first LUN in the first tier after the first snapshot is created; and
wherein the manager is further configured to erase data written to the first snapshot from the first LUN in the first tier except for data that was overwritten by new write I/Os directed for processing to the first LUN in the first tier.

27. The system of claim 16
wherein the manager is further configured to receive a request from a user for a requested snapshot of the second volume in the second tier and allocate a new volume for the first snapshot of data in the first LUN in the first tier; and wherein the controller is further configured to redirect I/Os intended for the second volume in the second tier to the new volume for the first snapshot in the first tier.

28. A computer program product including a non-transitory computer readable storage medium having computer program code encoded thereon that, when executed on one or more processors of a computer system, causes the computer system to:
expose to a storage host, via a virtual service layer spanning a first storage array including storage having a first latency and a second storage array including storage having a second latency, a virtual LUN comprising a first LUN in a first tier of storage provided by the first storage array having the first latency and a second LUN in a second tier of storage provided by the second storage array having the second latency, wherein the first latency is lower than the second latency;
manage the virtual LUN according to properties of the first LUN, properties of the second LUN, and an indicator written to the first LUN in the first tier of storage provided by the first storage array that data satisfying a policy is stored in the second LUN in the second tier of storage provided by the second storage array, wherein managing the virtual LUN comprises:
directing a plurality of write I/O for processing to the first LUN in the first tier at a first time; and
moving data written to the first LUN in the first tier to the second LUN in the second tier at a second time, wherein moving data written to the first LUN in the first tier to the second LUN in the second tier at a second time comprises:
creating a first snapshot of data in the first LUN in the first tier;
transferring data in the first snapshot to the second LUN in the second tier; and
creating a second snapshot of data in the second LUN in the second tier;
erasing the data written to the first snapshot from the first LUN in the first tier and,
processing an I/O command for data, wherein a first portion of the data exists in the first tier and a second portion of the data exists in the second tier, wherein data is read from the second tier only for blocks in which the indicator indicates that the data does not exist in the first tier.

29. The computer program product of claim 28 wherein the first LUN in the first tier has more performant snapshot capabilities than the second storage array in the second tier.

* * * * *